Inventor
CHARLES G. JOHANNESMEYER

Attorney

Jan. 6, 1942.  C. G. JOHANNESMEYER  2,269,024
POWER TRANSMISSION DEVICE
Filed March 8, 1940          2 Sheets-Sheet 2
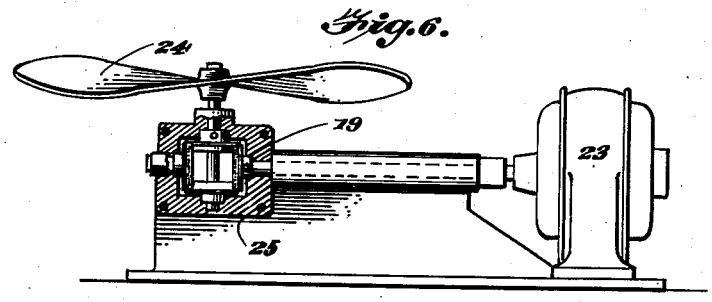
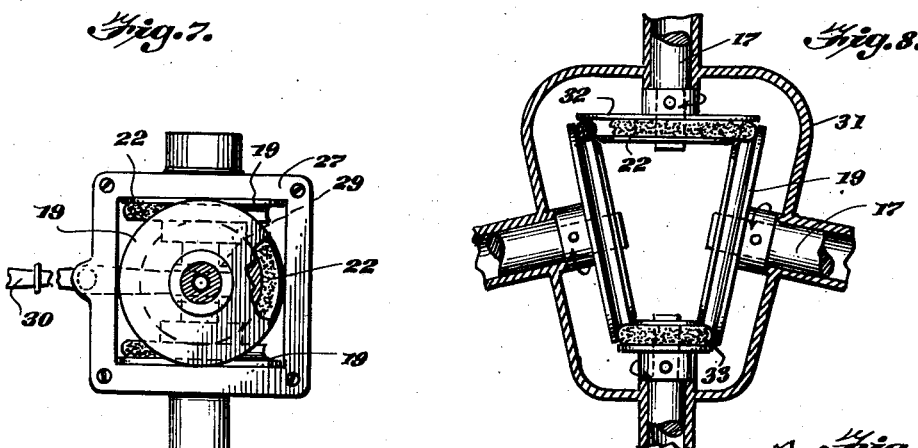
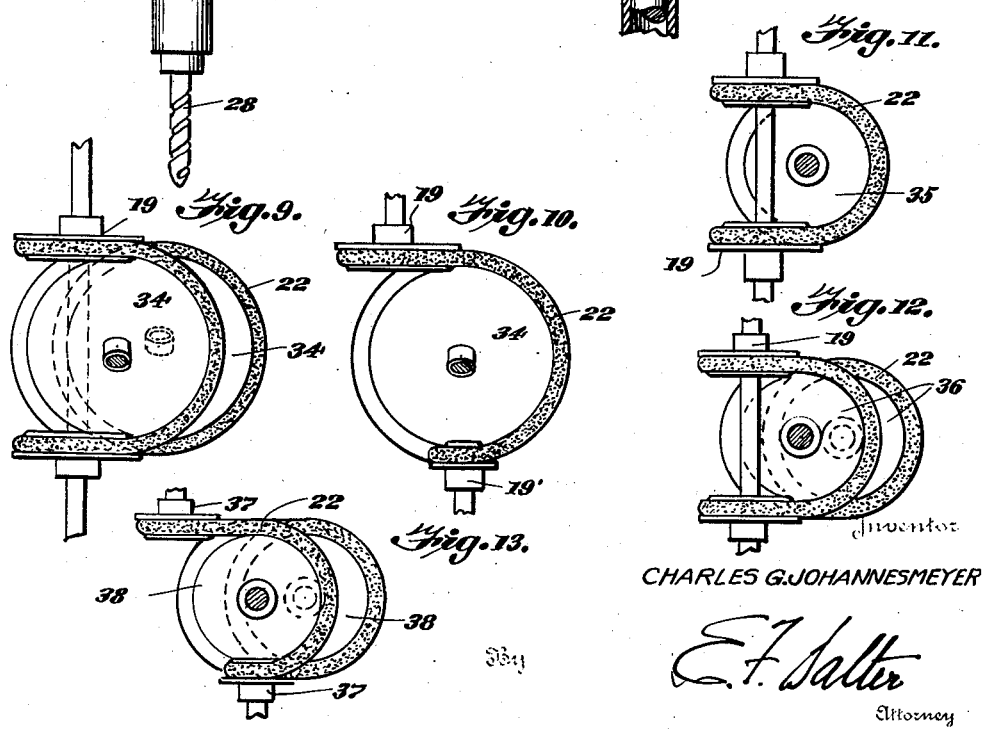
CHARLES G. JOHANNESMEYER
E. F. Salter
Attorney Patented Jan. 6, 1942

2,269,024

UNITED STATES PATENT OFFICE 2,269,024

POWER TRANSMISSION DEVICE

Charles G. Johannesmeyer, Meadville, Pa., assignor of one-half to Frederick H. Davenport, Meadville, Pa.

Application March 8, 1940, Serial No. 323,024

3 Claims. (Cl. 74—219)

This invention relates to power transmission devices, and more particularly to improvements in power transmission units for general application.

In power transmission units of the prior art, the use of bevel and mitre gears has resulted in several disadvantages. Such gears are expensive, are noisy in operation and unless they are encased in oil, they cannot be driven at high speeds due to breakage and noise resulting from such speeds. Encasing the gears in oil adds greatly to the expense of producing and operating such units.

An important object of the present invention is the provision of a power transmission unit which has no gears and which can be used for angular drives, reversing drives or differential drives which can be operated at high speeds without noise and without being encased in oil.

Another object of the invention is the provision of a device of this character which is inexpensive to manufacture and operate and which is efficient and durable in use.

Other objects and advantages of the invention will be apparent during the course of the following description.

In the drawings, which form a part of this specification and wherein like characters of reference denote like parts throughout, Figure 1 is a plan view of a transmission unit embodying the present invention, parts being broken away.

Figure 6 is an elevation of my unit applied to a right angle drive for a fan or propeller.

Figure 7 is an elevation of my unit applied to a reversing drive for a cutter spindle.

Figure 8 is a sectional view of a differential drive unit embodying my invention.

Figure 9 is a diagrammatic plan view of a transmission unit in which two of the pulley shafts are offset and disposed in angular relation.

Figure 10 is a similar view of another unit in which the shafts are both offset and angularly disposed.

Figures 11 and 12 show another form of the invention in which the various shafts are disposed in parallel and offset relation, and, Figure 13 is a view illustrating a further form of the invention in which all of the shafts are offset.

Figure 2:
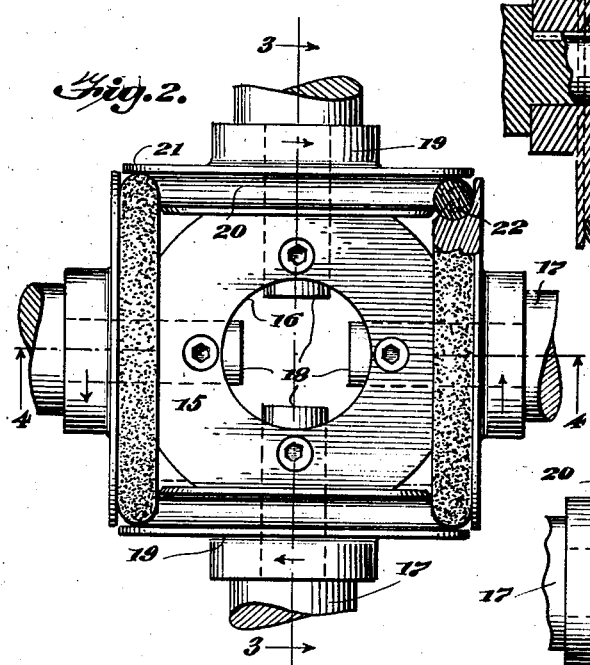
Figure 2 is a side elevation thereof.

In the drawings, wherein is shown a preferred embodiment of the invention for the purpose of illustration, the numeral 15 designates a journal and supporting block which is generally rectangular in shape with a central bore 16 extending therethrough and having its corners beveled, as seen in Figure 2. The journal block is not necessary where a suitable casing is provided in which the various shafts can be journaled, as in Figures 6, 7 and 8. Shafts 17 each have reduced stub ends 18 journaled centrally of block 15 and the shafts are spaced 90° from each other, opposite shafts being disposed in longitudinal alignment. A sheave or pulley 19 is mounted on the stub end 18 of each shaft immediately adjacent the side of the block 15, and the four pulleys or sheaves, when assembled, form a rectangle or square, as seen in Figure 2. In Figures 1 to 4 the pulleys are shown as of equal size so that no change in ratio is obtained. Each pulley 19 is provided with a peripheral groove 20 substantially semi-circular in cross-section. A flange 21 extends radially beyond the groove of each pulley and the wall of the groove merges into the wall of the flange.

A belt 22 is trained about the pulleys 19 and is preferably endless and of circular formation in cross-section, being of any suitable material. In the form of the invention shown in Figures 1 to 5 the belt engages half of the peripheral length of the groove of each pulley 19, assuming the shape illustrated in Figure 5, which consists of four interconnected U-shaped portions each of which is adapted to engage one of the pulleys 19. At the four points where the belt passes from one pulley to the next, the pulleys are in very close proximity and the adjacent grooves 20 thereof combine to produce a substantially circular groove at these points, as seen in the upper right hand portion of Figure 2.

It will be noted that each pulley is engaged by the belt for one half of its peripheral length, or 180°, and that the groove of each pulley engages the belt through a cross-sectional arc of substantially 180°, as shown in the cross-section of the belt in each of Figures 1 to 4. It will also be seen that at the four points where the belt engages two pulley grooves, that it is engaged through an arc of substantially 360°, as seen in the upper right hand portion of Figure 2. Due to this arrangement of the pulleys, grooves and belt, the belt is engaged throughout its entire length by one or more of the pulley grooves, and at the points where it passes from one pulley to the next pulley, it is engaged by two grooves. This construction provides the maximum frictional contact between the belt and pulleys and insures proper rotation of the pulleys at all times.

By reference to Figure 2, it will be seen that opposite pulleys are rotated in opposite directions, so that a right angle or reversing drive may be obtained through the transmission unit. The pulleys may be operated at any desired speed without being encased in oil, and without noise or breakage.

The term pulley is used herein to denote any sheave, disc, drum or the like capable of operating the belt, and any suitable material and construction may be employed. While it is preferred to employ a belt which is circular in cross-section and corresponding grooves in the pulleys, these members may obviously be of any desired complementary shape.

Figures 1 to 4 illustrate the unit per se which may be incorporated in any desired structure by making connection to the desired shafts 17. Where a change in ratio is desired, the pulley sizes are varied to produce the desired ratio.

In Figure 6 the unit is illustrated as applied to a right angle drive between a motor or other source of power 23 and a driven member 24 which is shown as a propeller. The pulleys are illustrated as journaled in the casing member 25, dispensing with the central block 15. The motor 23 is connected to drive the shaft of the right hand pulley while the fan 24 is connected to the shaft of the upper pulley. It will be seen that this construction provides a sturdy, compact drive which will be noiseless in operation and capable of any speeds. The pulley sizes may be varied to produce any ratio desired.

In Figure 7, the pulley unit is incorporated in a casing 27 carrying a rotating cutter spindle 28, or other member to be driven in reverse directions. A clutch mechanism 29 of the usual construction is provided between the pulleys to connect the spindle shaft to either the upper or lower spindle, or to disconnect the spindle shaft from both pulleys. When the clutch lever 30 is moved downwardly, the spindle 28 is connected to the upper pulley 19 to be rotated in one direction. When the clutch lever 30 is moved to its upper position, the spindle is connected to the lower pulley 19 to be driven in the opposite direction. The drive connection may be made to the upper pulley or to either of the side pulleys desired, and the clutch lever operated to drive the spindle 28 in the desired direction.

In Figure 8, a differential drive utilizing the present invention is illustrated. A casing 31 encloses the pulleys and belt, and the pulley shafts 17 are journaled in the walls of the casing. The side pulleys 19 are of the same size but are inclined in opposite directions. The upper pulley 32 is of smaller size than pulleys 19 while the lower pulley 33 is of still smaller size. A direct drive through pulleys 19 may be obtained if desired, or any one of three different ratios may be obtained through one of pulleys 19 and either of pulleys 32 or 33 or through pulleys 32 and 33. In this form of differential drive, the same maximum contact between the pulleys and belt is obtained as in the form shown in Figures 1 to 4.

Any desired ratio may be built into the pulleys, and an infinite variety of pulley arrangements may be employed. In Figure 9 is shown one possible arrangement in which two of the pulleys 19 are disposed in parallel relation with their shafts aligned, while the other two pulleys 34 are offset and disposed in angular relation with each other. In Figure 10 the pulleys 34 are angularly disposed while the pulley 19' is offset with respect to pulley 19. In Figure 11 the shafts of opposite pulleys are aligned but the shafts of pulleys 19 are offset with respect to the shafts of pulleys 35. In Figure 12, the shafts of pulleys 19 are aligned while the shafts of pulleys 36 are offset with respect to each other and to the shafts of pulleys 19, although disposed in parallel relation.

In Figure 13, the shafts of pulleys 37 are parallel but offset while the shafts of pulleys 38 are also parallel and offset. It will be seen that the pulley and belt construction of this invention readily lends itself to a great variety of different forms to meet the needs of a great variety of different uses.

It will be seen that the transmission of the present invention is of simple and sturdy construction, consisting of but four pulleys and one belt, and that it provides maximum belt contact and efficiency in a noiselessly operating construction which does not require the use of oil reservoirs. The present construction is particularly well adapted for operation at high speeds, although capable of use for any speed, and can be readily used for any desired ratio or for reversing direction of rotation. As illustrated in the various views of the drawings, the transmission may be used for direct drives, differential drives, right angle drives, offset drives or spiral drives without the disadvantages found in the use of mitre or bevel gears, and with all of the advantages arising from the use of such gears. Not only is the drive of this invention cheaper to manufacture than the usual gears, but it lacks the noisy operation and limited speed of such gear drives.

The basic elements of the improved drive are illustrated in Figures 1 to 5 while a few of the uses of this unit are illustrated in Figures 6 to 13. Obviously, the invention may be applied to a great variety of other uses, and as seen in Figures 6 to 13, is easily modified to meet the changing conditions found in various uses. Due to the large area of contact between the pulleys and belt, the unit will transmit a great deal more power for its size than the conventional flat frictional contact between belt and pulley.

Figure 1:
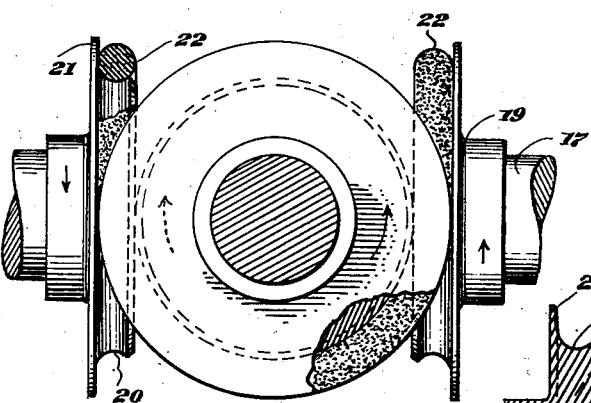
Figure 3:
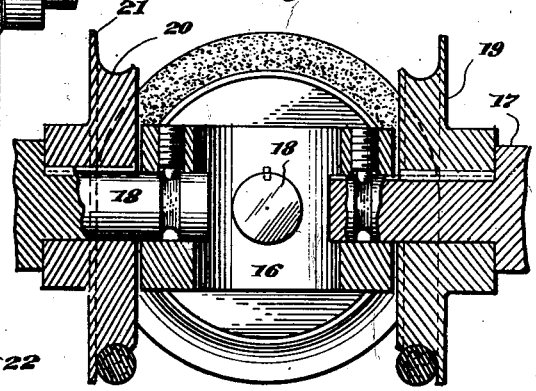
Figure 3 is a sectional view on the line 3—3 of Figure 2.
Figure 4:
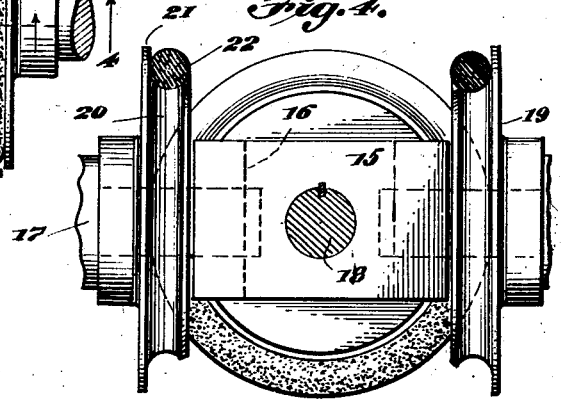
Figure 4 is a sectional view on the line 4—4 of Figure 2, parts being shown in elevation.
Figure 5:
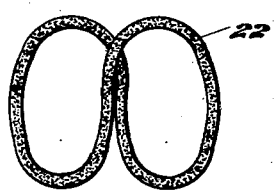
Figure 5 is a perspective view of the driving belt showing its form when in operative position.

In the specification and claims, the cross-sectional contact between the pulley groove and the pulley, as illustrated in Figures 2, 3, and 4, is described as substantially 180°, while the four points where the pulleys approach each other have been described as having a contact of substantially 360°. From an inspection of the drawings, it will be seen that the contact arc is slightly less than 180° and 360°, but it does approach these arcs. The contact arc will vary somewhat from the full 180° contact, but will not be less than 135° in practice, and will range from a minimum of 135° to a maximum of 180°, except at the four points where it approaches 360°. The term "substantially 180°" will therefore be understood as describing the arc illustrated which will range between 135° and 180°.

While I have shown and described the preferred embodiment of the invention, it is to be understood that various changes in the size, shape and arrangement of parts may be resorted to without departing from the spirit of my invention or the scope of the subjoined claims.

Having thus described my invention what I claim and desire to protect by Letters Patent is:

1. In a transmission device, four opposed pulleys journaled for rotation in close proximity to each other, there being semi-circular grooves disposed about the peripheries of said pulleys, radial flanges on said pulleys having walls merging into the walls of the grooves, said pulley grooves combining at four points to form substantially circular openings for the passage of a belt in contact with the grooves of two pulleys at each of said four points, an endless belt of circular cross-section disposed in the grooves of said pulleys and frictionally engaging the groove of each pulley through an arc of substantially 180° of the periphery of the pulley, said grooves frictionally engaging the belt through a cross-sectional arc of substantially 180°, means to rotate one of said pulleys, and a driven member operatively connected to another of said pulleys.

2. In a power transmission device, a pair of spaced opposed pulleys journaled for rotation, there being grooves extending about the peripheries of said pulleys, a second pair of pulleys of smaller diameters than said first named pair of pulleys journaled for rotation in proximity to said first named pair of pulleys, there being grooves in the peripheries of said smaller pulleys, said four pulleys forming the sides of a substantially closed polygon, the grooves in said pulleys cooperating at the corners of the polygon to form an opening for the passage of a belt, and an endless belt disposed in the groove of each pulley and engaging each pulley through a peripheral arc of substantially 180°, whereby rotation of one pulley will rotate all of said pulleys.

3. In a power transmission device, four opposed pulleys journaled for rotation and said pulleys forming the sides of a substantially closed polygon, there being semi-circular grooves arranged in the peripheries of the pulleys, said grooves combining to form circular openings at the corners of the polygon for the passage of a belt, an endless belt of circular cross-section disposed in said grooves and frictionally engaging each groove through a peripheral arc of substantially 180°, said belt being frictionally engaged by each groove through a cross-sectional arc of substantially 180° and by two grooves at each corner of the polygon through a cross-sectional arc of substantially 360°, and means to rotate one of said pulleys whereby all of said pulleys will be rotated by said belt.

CHARLES G. JOHANNESMEYER.